United States Patent [19]

Toriu

[11] 4,334,252
[45] Jun. 8, 1982

[54] MAGNETIC RECORDING AND REPRODUCING HEAD ARRANGEMENT

[75] Inventor: Jirou Toriu, Amagasaki, Japan

[73] Assignee: Mitsubishi Denki Kabushiki Kaisha, Tokyo, Japan

[21] Appl. No.: 129,409

[22] Filed: Mar. 11, 1980

[30] Foreign Application Priority Data

Mar. 20, 1979 [JP] Japan .................................. 54-32569

[51] Int. Cl.³ .......................... G11B 5/48; G11B 21/02
[52] U.S. Cl. ...................................... 360/104; 360/75; 360/103; 360/109; 360/121
[58] Field of Search ....................... 360/104, 102–103, 360/105, 121, 75–78, 97–99, 21

[56] References Cited

U.S. PATENT DOCUMENTS 3,911,483  10/1975  Kihara et al. .................... 360/77 X
4,007,493  2/1977   Behr et al. ........................ 360/77
4,146,911  3/1979   Gyi et al. ........................ 360/97 X
4,148,080  4/1979   Ragle et al. ..................... 360/21 X

FOREIGN PATENT DOCUMENTS 53-120415  3/1978  Japan .
53-145814  4/1978  Japan .
54-8514    1/1979  Japan .................................. 360/103

Primary Examiner—John H. Wolff
Attorney, Agent, or Firm—Wenderoth, Lind & Ponack

[57] ABSTRACT

A magnetic recording and reproducing head arrangement utilizing the azimuth recording method which has an even number 2n of magnetic heads mounted in the head assembly. The carriage holds the head assembly at rest during recording or reproduction and moves the head assembly at right angles to the direction of transportation of the magnetic recording medium to change the tracks to be recorded or to be reproduced. The centers of the head gaps of the magnetic heads fall in a straight line which is at right angles to the direction of transportation of the magnetic medium and the separations therebetween are determined by the conditions that almost all the tracks are tracked by the magnetic heads, practically without leaving any unrecorded tracks within the recording region of the magnetic recording medium, and that magnetic interference between the magnetic heads is negligible. One half of the number of magnetic heads have a gap azimuth different to that of the other half of the number of magnetic heads so that the magnetizations on even ordinal and odd ordinal tracks have different directions from each other.

6 Claims, 16 Drawing Figures

MAGNETIC RECORDING AND REPRODUCING HEAD ARRANGEMENT

BACKGROUND OF THE INVENTION

1. Field of the Invention

This invention relates to magnetic recording and reproducing head arrangements, and especially to dispositions or configurations of magnetic heads in the head assembly of a multi-head magnetic disk or tape memory device of the moving-head type which realizes recording of information with high track density by utilizing the azimuth recording method.

2. Description of the Prior Art

As one of the conventional methods which realize high track density recording, one could mention the azimuth recording method which is utilized, for example, in video tape recorders. In video tape recorders utilizing this method, a magnetic tape is wound around a rotational head cylinder and is helically scanned by two magnetic heads included therein which have different gap azimuths, or directions of the head gaps, with respect to the direction of width of the recording tracks on the tape. In this way, this method realizes a high track density recording without the need for the inter-track blank regions which, otherwise, must be disposed between the recording tracks for the purpose of prevention of interference or "cross-talk" between the tracks. The azimuth recording method is characterized by the prevention of cross-talk between the adjacent tracks by the effect of azimuth loss in the process of reproduction. This effect results from the fact that the recording and reproduction on adjacent tracks are carried out by the magnetic heads which have different gap azimuths, and therefore magnetizations formed on the adjacent tracks are caused to have different directions. Thus, recording without inter-track regions becomes possible, with the recording tracks disposed closely adjacent to or partly overlapping each other.

The present invention is concerned with a multihead, moving-head system which is utilized, for example, in magnetic disk memories utilizing the azimuth recording method. The head assembly of a magnetic disk memory is held at rest when the tracks are being tracked by the magnetic heads, and is moved in steps in the direction of the radius of the disk to change the tracks to be tracked by the heads. A magnetic disk memory device utilizing the azimuth recording method is disclosed, for example, in Japanese Laid-Open Patent Application No. 120415/1978. The device according to this patent application comprises a flying head assembly including therein two magnetic heads which oppose the surface of the magnetic disk. The two magnetic heads having different gap azimuths are disposed in and held by the head assembly in such a way that the centers of the gaps of the magnetic heads are separated by the track pitch of the disk in the radial direction of the disk, and also in the circumferential direction thereof by a predetermined distance necessary to prevent magnetic interference between the two magnetic heads. This configuration or disposition of the magnetic heads in the head assembly has resulted in the problem that a slight alignment error of the head assembly with respect to the magnetic disk causes the adjacent tracks recorded by the two magnetic heads to overlap each other, thereby occasioning cross-talk or complete obliteration of information. Another disadvantage of the device according to the above patent application results from the fact that the lower face of the flying head assembly which maintains a slight separation from the disk surface during the rotation of the disk is inclined downwardly in the direction of rotation of the disk with respect to the disk surface, and thus has a greater separation at one magnetic head than at the other. This difference between the spacings of the two magnetic heads from the disk surface has resulted in the disadvantage that the recording and reproducing characteristics of the two magnetic heads are completely different.

These problems or disadvantages become more serious when more than two magnetic heads are mounted in a single head assembly and the circumferential distance between the two outermost magnetic heads becomes greater.

SUMMARY OF THE INVENTION

Accordingly, it is an object of the present invention to provide a new and improved magnetic recording and reproducing head arrangement of the above-mentioned kind which realizes high track density recording by the azimuth recording method without disposing inter-track regions between the recording tracks, and is free of the above-mentioned drawbacks or problems.

Another object of the present invention is to provide a new and improved magnetic recording and reproducing device of the last mentioned kind in which the differences in the recording and reproducing characteristics among the magnetic heads are substantially decreased while the tolerance for the mounting precision of the head assembly can be increased without incurring the danger of tracking errors, and which, therefore, is easier to manufacture and has a greater practical value.

These and other objects have been attained by a magnetic recording and reproducing head arrangement for use with a magnetic recording medium which is transported by a transportation means and has formed on the surface thereof a plurality of parallel tracks running in the direction of transportation of said magnetic recording medium, comprising an even number 2n of magnetic heads, each of which has at least one head gap and which are disposed in a head assembly, and a carriage means which supports said head assembly in such a way that the lower face of said head assembly opposes said surface of the magnetic recording medium, and which holds said head assembly at rest when the tracks are being tracked by said magnetic heads, and moves it at right angles to said direction of transportation of said magnetic medium with a step of 2n times the track pitch to change the tracks to be tracked by said magnetic heads.

The magnetic heads of said head arrangement are disposed in said head assembly in such a disposition or configuration that the following four conditions are met:

Condition (1): The centers of the head gaps of at least two magnetic heads out of the 2n magnetic heads fall in a straight line which is parallel to the direction of the movement of said carriage means.

Condition (2): The separation between any two magnetic heads of the 2n magnetic heads is not less than a distance necessary to prevent the magnetic interference between the two magnetic heads.

Condition (3): The separation or spacing $S_j$ in the direction of movement of said carriage means, between the centers of the head gaps of an outermost magnetic head (namely, one of the two magnetic heads lying outermost with respect to said direction of movement of said carriage, which is referred to as the first magnetic head) and the j th magnetic head satisfies the equation:

$$Sj/P \equiv (j-1) \quad \text{mod. } 2n$$

(Sj/P is congruent to (j−1) with respect to modulus 2n), wherein P is the track pitch of the tracks formed on the magnetic recording medium, and j is an integer not less than 1 and not greater than 2n. (Note that the j th magnetic head is not necessarily the one which occupies the j th position counting from the outermost or the first magnetic head, but is the one which is separated from the first magnetic head by the distance Sj that satisfies the equation above.)

Condition (4): The head gaps of odd ordinal and even ordinal magnetic heads of said 2n magnetic heads have different gap directions with respect to said direction of the movement of the carriage means, that is to say, have different gap azimuths. Therefore it results that the magnetizations formed by said head gaps on odd ordinal and even ordinal tracks of said plurality of tracks are caused to have different directions from each other.

From the condition (3) above, it follows that the j th magnetic head tracks every i th track of said plurality of tracks that satisfies the following two conditions (A) and (B):

$$(A) \quad i \equiv j \quad \text{mod. } 2n$$

(i is congruent to j with respect to modulus 2n), and $$(B) \quad m - (S - Sj)/P \geq i > Sj/P$$

wherein m is the number of the tracks, and S is the maximum value of Sj's, on the spacing in the direction of the movement of said carriage means between the centers of the head gaps of the two outermost magnetic heads. The i th track is the track which lies at the i th position counting from the outermost track or the first track.

The condition (1) may be preferably modified to the following more strict condition (1'):

Condition (1'): All the centers of the head gaps of the 2n magnetic heads fall in a straight line which is parallel to the direction of the movement of said carriage means.

BRIEF DESCRIPTION OF THE DRAWINGS

The objects and principles of the invention will become more apparent from the following detailed description of the invention, which includes closer examination of the prior art device that has been mentioned above, taken in conjunction with the accompanying drawings, in which.

In the drawings, like reference numerals and letters designate like elements, distances, angles, or reference lines and points, etc.

DESCRIPTION OF THE PREFERRED EMBODIMENT

Figures 1, 2, 4:
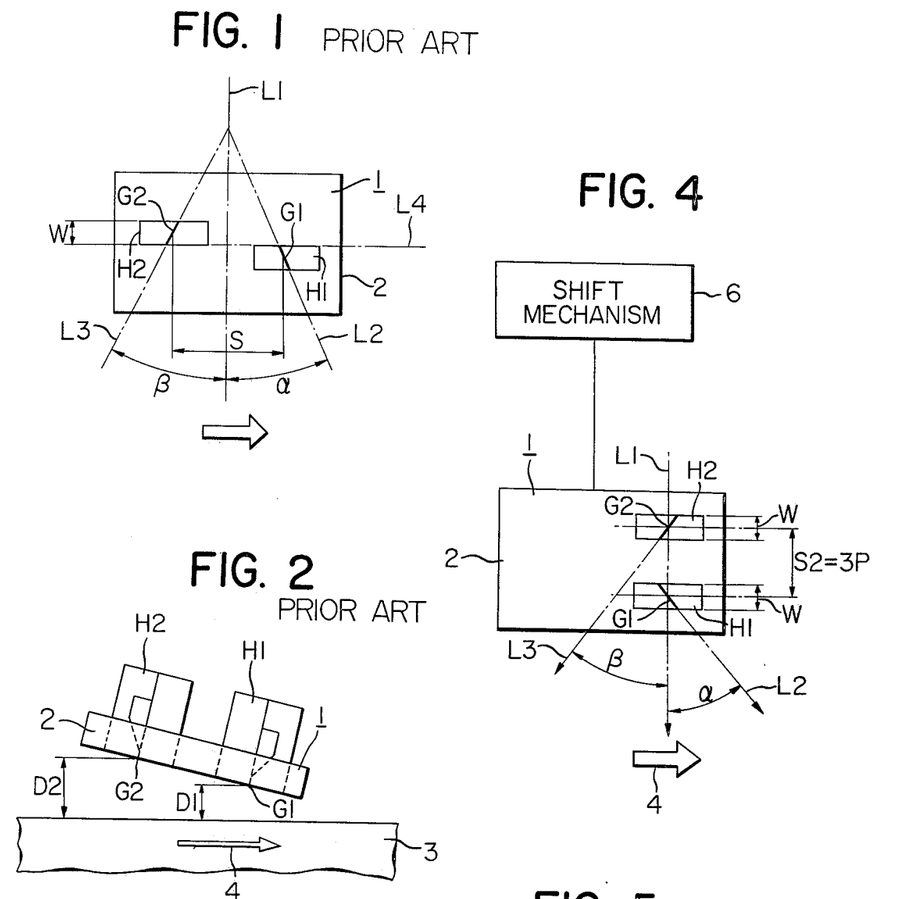
FIG. 1 is a schematic bottom plan view showing the lower or opposing face of the flying head assembly of a prior art magnetic disk memory device, showing the lower face of the flying head assembly.
FIG. 2 is a schematic side view of the flying head assembly of the prior art device of FIG. 1, illustrating the operating state thereof together with a portion of the magnetic disk.
FIG. 4 is a schematic bottom plan view of the flying head assembly having two magnetic heads according to the present invention, showing the lower face of the flying head assembly thereof.
Figure 3:
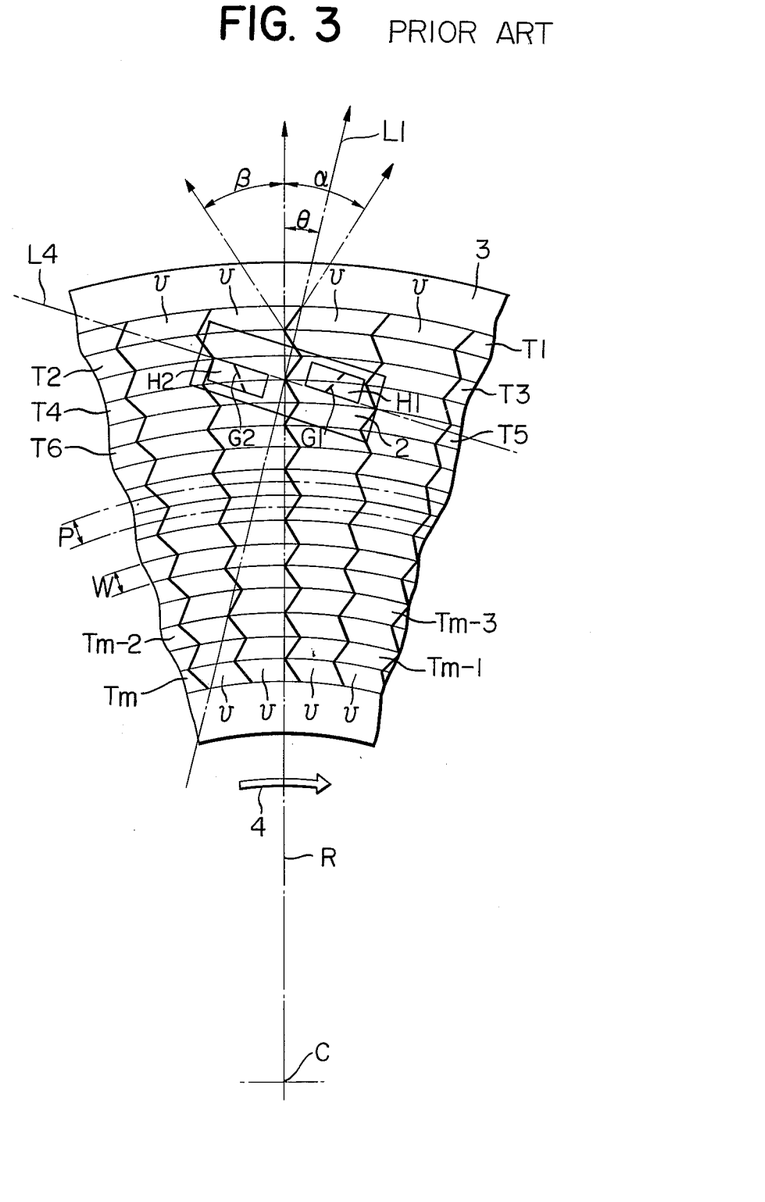
FIG. 3 is a schematic partial plan view of the magnetic disk, illustrating the arrangement of the data tracks formed by the prior art device of FIG. 1.

Referring to FIGS. 1 through 3, a closer description is made of a prior art magnetic disk memory device utilizing the azimuth recording method which is disclosed, for example, in Japanese Laid-Open Patent Application No. 120415/1978 mentioned above. FIG. 1 is a bottom plan view of a flying head assembly 1 of a prior magnetic disk memory device and shows the lower or opposing face of the head assembly 1 thereof which opposes the surface of a magnetic disk 3. The head assembly 1 comprises a slider 2 which has fixedly mounted therein two megnetic heads H1 and H2, one side of each of which is parallel to and in contact with the longitudinal central line L4. The centers of the head gaps G1 and G2 of the magnetic heads H1 and H2 are spaced by a distance S of 3 mm in the longitudinal direction, or in the direction of rotation of the magnetic disk 3, which distance is deemed necessary to prevent magnetic interference between the two magnetic heads H1 and H2. The magnetic heads H1 and H2 have a width equal to the track width W of the tracks T1, T2, T3, . . ., Tm, to be formed on the magnetic disk 3. FIG. 2 is a side view of the prior art device shown in FIG. 1, and shows the relative spacial relationship between the flying head assembly 1 and the magnetic disk 3 during recording and reproduction. The flying head assembly 1 "flies over" or keeps a small amount of separation from the surface of the disk 3 which rotates at a high speed in the direction indicated by an arrow 4, and is kept in a steady state by a force exerted by a head load (not shown), which balances the force exerted by the air sandwiched between the slider 2 and the disk 3, the head gaps G1 and G2 of the magnetic heads H1 and H2 maintaining separations D1 and D2, which are equal to 0.5 $\mu$m and 1 $\mu$m respectively.

FIG. 3 is a plan view of the magnetic disk 3, and shows the arrangement of data tracks T1, T2, T3, . . ., Tm which are formed on the surface of the magnetic disk 3 by the magnetic heads H1 and H2. In each of the tracks information is recorded in magnetic recording units U, which are different in linear length but occupy the same rotational angles.

The flying head assembly 1 is fixedly mounted on a carriage (not shown) in such a way that the lateral central line L1 is held in registry with a radius R of the magnetic disk 3 issuing from the center C thereof, and also that magnetic head H1 comes on the outer side with respect to the magnetic disk 3 while magnetic head H2 is located towards the inside. The carriage has a construction capable of moving the flying head assembly 1 along the radius R of the magnetic disk 3 in steps with a step of two times the track pitch P of the tracks in the direction of the radius R, that is to say, at right angles to the direction of rotation of the magnetic disk 3. The track pitch P is the distance between the central lines of two adjacent tracks, and is assumed to be equal to the track width W in this case. The direction of rotation here means the direction of the tangent to the direction of rotation. A structure of a carriage mechanism which effects this kind of movement is disclosed, for example, in U.S. Pat. No. 3,656,015.

At the begining of operation of this prior magnetic disk memory, the two outermost tracks T1 and T2 are recorded by the magnetic heads H1 and H2. Then the head assembly 1 is moved by the carriage along the radius R to the position in which the magnetic heads H1 and H2 come just above the tracks T3 and T4 respectively. The head assembly 1 is held at rest at said position and the tracks T3 and T4 are recorded by the magnetic heads H1 and H2 respectively. In this way, the tracks T5, T6, . . ., Tm−1, Tm in the data track region, or the recording region, of the magnetic disk 3 are successively recorded. The head gaps G1 and G2 of the magnetic heads H1 and H2 have gap azimuths (or angles between the gaps directions L2 and L3 of the head gaps and the direction of the lateral central line L1 which is parallel to the radius R of the magnetic disk 3), $\alpha$ and $\beta$ in and against the direction of rotation of the magnetic disk 3, which are both equal to 12 degrees. Thus, just as in the case of the video tape recorders utilizing the azimuth recording method, the magnetization directions on an adjacent pair of tracks forms the angle $\alpha+\beta$ which is equal to 24 degrees, thereby realizing a high track density recording allowing less crosstalk between the tracks.

In the prior device described above, the magnetic heads H1 and H2 are separated by a distance S in the direction of the longitudinal central line L4, that is, in the direction of the rotation of the disk 3, to decrease the magnetic interference between the magnetic heads. But this measure has resulted in the problem that the separations D1 and D2 of the head gaps G1 and G2 of the magnetic heads H1 and H2 from the disk surface are greatly differentiated, that is to say, the separation D2 of the head gap G2 from the disk surface is much greater than the separation D1 of the head gap G1, because the slider 2 flies over the surface of the magnetic disk 3 with a certain amount of downward inclination in the direction of rotation of the magnetic disk 3 with respect to the disk surface.

Thus the device has the disadvantage that the recording and reproducing characteristics of the magnetic heads H1 and H2 are very different.

There is another disadvantage of this prior device. The flying head assembly 1 is intended to be fixedly mounted on the carriage in such a way that the lateral central line L1 and the radius of the magnetic disk 3 become in registry with each other, but mounting with such precision is difficult. In practice, it cannot be avoided that the head assembly 1 is fixed on the carriage with the lateral central line L1 inclined by a small angle $\theta$ with respect to the radius R, as shown in FIG. 3. If this occurs, then the tracks T1, T3, T5, . . . tracked by the magnetic head H1 are displaced by a distance S sin $\theta$ from the normal positions thereof with respect to the tracks T2, T4, T6, . . ., which are tracked by the magnetic head H2. Assuming that S is equal to 3 mm and $\theta$ to 1 degree, the distance S sin $\theta$ becomes as great as about 0.052 mm. In the case of narrow track recording with the track width W of 0.05 mm, this results in a great inconvenience that the tracks T1, T3, T5, . . . tracked by the magnetic head H1 and the tracks T2, T4, T6, . . . tracked by the magnetic head H2 are almost completely overlapped. Even when we assume that a displacement of less than 10 percent of the track width W of the tracks T2, T4, T6, . . . tracked by the magnetic head H2 with respect to the tracks T1, T3, T5, . . . tracked by the magnetic head H1, from the normal position thereof, can be tolerated, the mounting of the head assembly 1 on the carriage requires such a high degree of precision that said angle $\theta$ must not exceed 6 minutes. Such a degree of precision is hardly attainable in view of the necessary process of manufacturing and mounting of the flying head assembly 1, this fact giving rise to a serious practical problem.

This invention aims at the provision of a new and improved magnetic recording and reproducing device which is free of the above mentioned drawbacks or problems.

Figure 5:
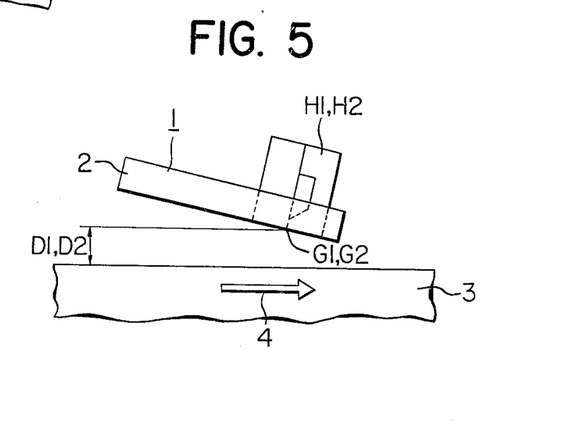
FIG. 5 is a schematic side view of the flying head assembly of FIG. 4, showing the operating state thereof together with a portion of the magnetic disk.
Figure 6:
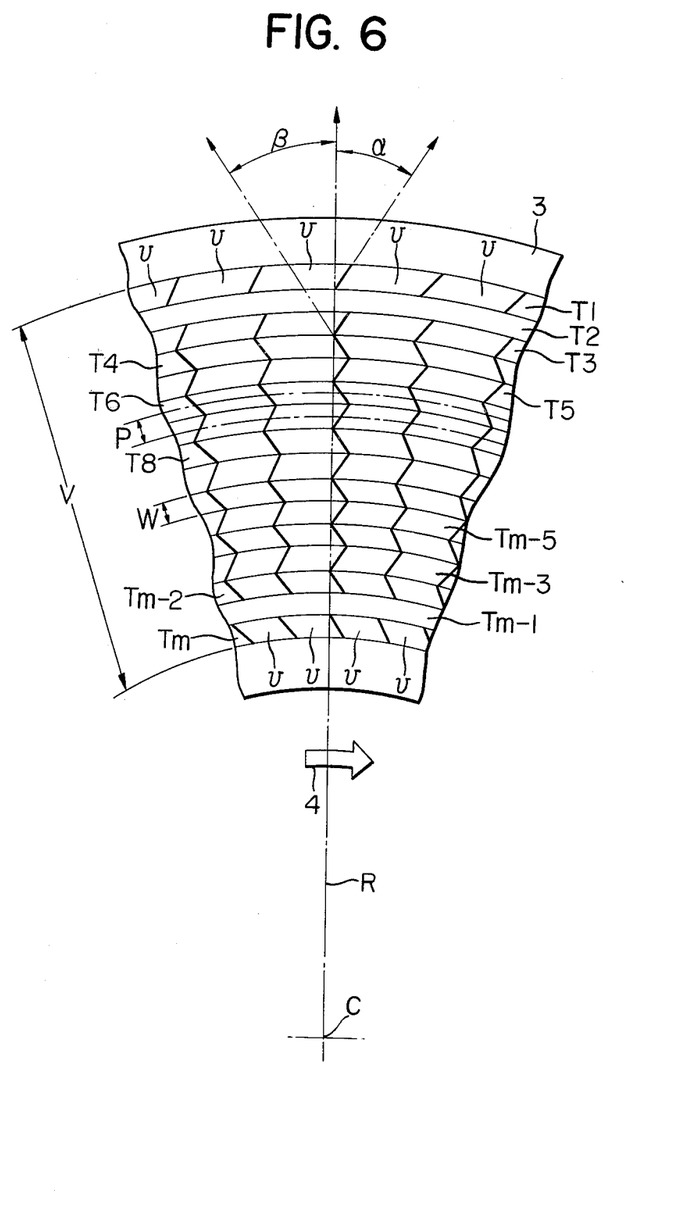
FIG. 6 is a schematic partial plan view of the magnetic disk showing the arrangement of the data tracks formed thereon by the device of FIGS. 4 and 5.

In the following, embodiments of the present invention, having two magnetic heads are first described referring to FIGS. 4 to 9. As a first embodiment of the present invention the head arrangement of a magnetic disk memory device having two magnetic heads according to the present invention is described making reference to FIGS. 4 through 6. FIG. 4 is a schematic bottom plan view of the flying head assembly 1 and the carriage 6 of the head arrangement of a magnetic disk memory device according to the present invention, and shows the lower or opposing face of the flying head assembly 1. FIG. 5 is a schematic side view of the flying head assembly 1 and a portion of the magnetic disk 3 thereof, and shows the relative spacial relationship of the flying head assembly 1 and the magnetic disk 3 in the operating state thereof. FIG. 6 is a schematic plan view of a portion of the magnetic disk 3 thereof, and shows the state of the data tracks T1, T2, T3, ..., Tm formed on the surface of the magnetic disk 3. These three figures are schematic representations enlarging the important features of the device. As shown in FIG. 4, the flying head assembly 1 of the device according to the present invention comprises a slider 2 which has fixedly mounted therein two magnetic heads H1 and H2 having a width equal to the track width W of 25.0 μm for example. The centers of the head gaps G1 and G2 of the magnetic heads H1 and H2 fall in a straight line L1 which is at right angles to the direction of rotation of the magnetic disk 3, and are spaced by a distance S2 which is equal to 3P or 76.2 μm, the track pitch P being 25.4 μm. The track pitch P is the distance between the central lines of an adjacent pair of tracks. Magnetic head H1 is disposed on the outer side wth respect to the magnetic disk 3, magnetic head H2 being located toward the inside. The direction of rotation here means the direction of the tangent to the direction of rotation. The head gaps G1 and G2 have gap azimuths (or angles between the gap directions L2 and L3 of the head gaps and the direction of the straight line L1 which is at right angles to the direction of rotation of the magnetic dis) α and β in and against the direction of rotation of the magnetic disk 3, which may both be equal to 12 degrees.

As is shown in FIG. 5, the flying head assembly 1 in operation maintain a slight separation from the surface of the disk 3, the opposing face thereof being inclined downwardly in the direction of rotation of the magnetic disk 3, thereby causing the air flow generated near the surface of the magnetic disk 3 rotating fast in the direction shown by the arrow 4, to exert a lifting force on the head assembly which is balanced by another force exerted by a head load (not shown). But this inclination of the opposing face of the head assembly 1 does not result in the differentiation of separations D1 and D2 of the head gaps G1 and G2 from the disk surface as was the case in the prior art device as shown in FIGS. 1 through 3, because the centers of the head gaps G1 and G2 of the magnetic heads H1 and H2 fall in a straight line L1 which is held at right angles to the direction of transportation or rotation of the magnetic disk 3. Thus, as the separations D1 and D2 of the head gaps G1 and G2 from the disk surface have an equal value, which is equal to 0.5 μm in this embodiment, the amount of differentiation between the recording and reproducing characteristics of the magnetic heads H1 and H2 is greatly decreased. In what follows, a description is made of the arrangement of the tracks formed on the magnetic disk 3, referring to FIG. 6. The flying head assembly 1 is fixedly mounted on a carriage or a shifting mechanism 6 in such a way that the straight line L1 passing through the centers of the head gaps G1 and G2 of the magnetic heads H1 and H2 is held in registry with a radius R passing through the center C of the magnetic disk 3, and the mechanism 6 effects the movement of the head assembly 1 in steps along the radius R of the magnetic disk 3 with a step of two times the track pitch P. At the beginning the magnetic heads H1 and H2 at the outermost position thereof with respect to the magnetic disk 3 effect recording on the tracks T1 and T4. When the recording on the tracks T1 and T4 has been completed, the flying head assembly 1 is moved by the shifting mechanism 6 by a distance of two times the track pitch P, namely, by 50.8 μm in this embodiment along the radius R to the inner side with respect to the magnetic disk 3, and the tracks T3 and T6 are recorded by the magnetic heads H1 and H2 respectively. After this, the head assembly 1 is moved further by said distance of two times the track pitch P to the inner side along the radius R, and the tracks T5 and T8 are recorded by the magnetic heads H1 and H2 respectively. Repeating the like operations, all the tracks from the outermost track T1 to the innermost track Tm are recorded by the magnetic heads H1 and H2 except for two tracks T2 and Tm−1.

In the arrangement of the tracks recorded on the recording region on the surface of the magnetic disk 3 by above-described steps, the track T2, which is the outermost but one, and track Tm−1 which is the innermost but one, are left unrecorded. Thus there are two unrecorded tracks out of m tracks. But an adjacent pair of tracks are recorded by the head gaps G1 and G2 having different gap azimuths just in the case of the prior art device according to FIGS. 1 to 3. Therefore, the device as shown in FIGS. 4 to 6 according to the present invention also effects an azimuth recording allowing less interference between the tracks, and thus realizes a high track density recording. The number of the unrecorded tracks T2 and Tm−1 is two in this embodiment irrespective of the values of the track pitch P or of the width of the recording region V used. Therefore, in the case of high track density recording utilized in the devices presently in question, for example, in the case where V is equal to 25.4 mm and P is equal to 0.0254 (the track density is equal to 1,000 tracks per inch in this example), the width of the recording region occupied by the unrecorded tracks does not exceed 0.2 percent of width V of the overall recording region, and is considered to be within the range of negligible magnitude. Also, as the centers of the head gaps G1 and G2 of the magnetic heads H1 and H2 are separated by a distance S2 equal to three times the track pitch P, the magnetic interference between the cores of the magnetic heads H1 and H2 is decreased, and an error of the mounting angle of the heads H1 and H2 with respect to the shift mechanism 6 no longer gives rise to a serious problem, as was the case in prior devices.

In the embodiment described above, the present invention is applied to a magnetic disk memory device. But the present invention is also applicable to magnetic tape or magnetic sheet devices having a carriage means or a shifting mechanism for effecting the movement of magnetic heads at right angles to the direction of travel of the magnetic recording medium, with completely the same merits obtained thereby. In the above-described embodiment, the centers of the head gaps G1 and G2 of the magnetic heads H1 and H2 are separated by a distance S2 equal to three times the track pitch P, but S2 can be any positive integer of the form (2x+1) P (wherein x signifies a positive integer), with the same merits as described above being maintained. The number of unrecorded tracks in this case is equal to 2x.

Figure 7:
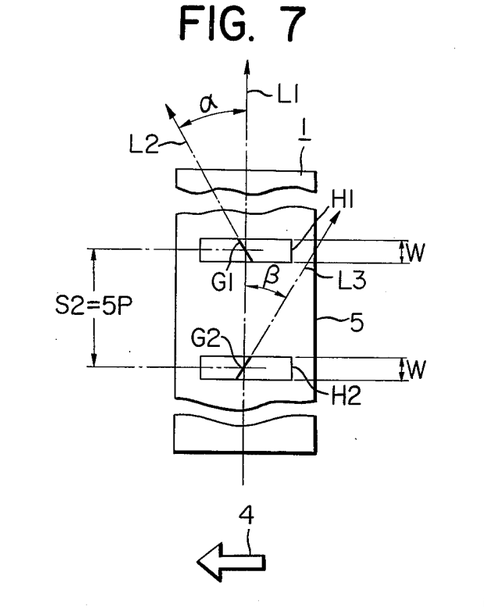
FIG. 7 is a schematic front view of the head assembly of a magnetic tape device having two magnetic heads according to the present invention.
Figure 8:
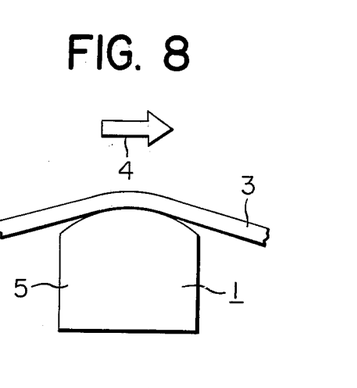
FIG. 8 is a schematic plan view of the head assembly of the device of FIG. 8, showing the operating state thereof together with a portion of the magnetic tape.
Figure 9:
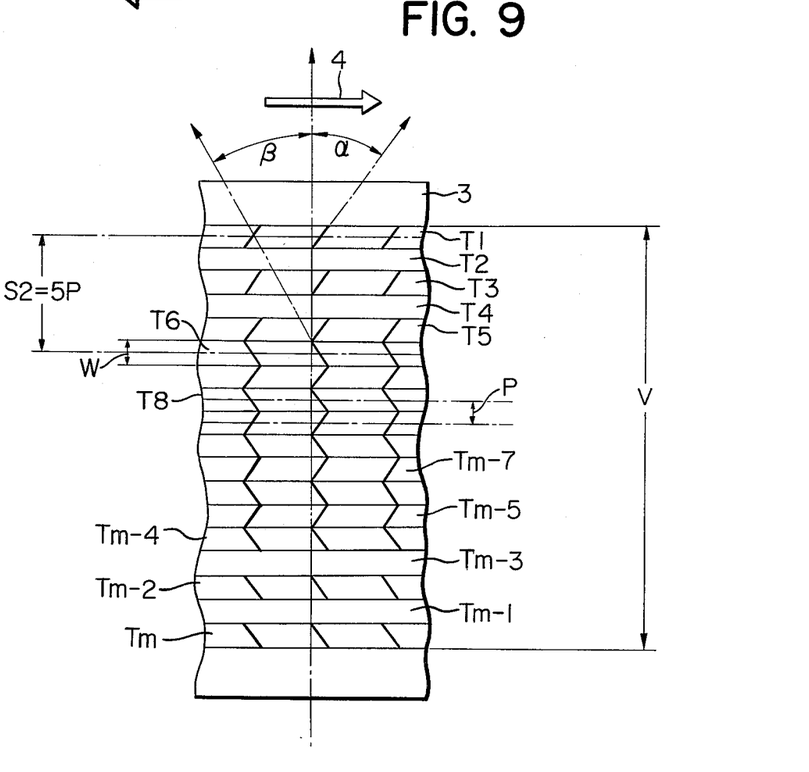
FIG. 9 is a schematic partial plan view of the magnetic tape illustrating the arrangement of the data tracks formed thereon by the device of FIGS. 8 and 9.

Another embodiment of the present invention, namely, a magnetic tape device having two magnetic heads, wherein the separation S2 between the centers of the head gaps is equal to five times the track pitch P, is shown in FIGS. 7 through 9. This embodiment corresponds to the case where number X appearing in the equation above is equal to 2. FIG. 7 is a partial plan view of the multi-head assembly 1 of a magnetic tape device according to the present invention and illustrates the opposing face of the multi-head assembly 1. The multi-head assembly 1 comprises a housing 5 which has fixedly mounted therein two magnetic heads H1 and H2 having head gaps G1 and G2 respectively. FIG. 8 is a side view of the multi-head assembly 1 and the magnetic tape 3, and shows the spacial relationship thereof. Since the centers of the head gaps G1 and G2 of the magnetic heads fall in a straight line L1 which is at right angles to the direction of travel of the magnetic tape 3, the contacts between the magnetic heads H1 and H2 and the magnetic tape 3 are equalized with respect to one another. Therefore, the differentiation in the recording and reproducing characteristics of the two magnetic heads H1 and H2 resulting from unequal contacts of the magnetic heads H1 and H2 on the tape 3 is decreased. FIG. 9 is a plan view of a portion of the magnetic tape 3, and shows the arrangement of the tracks T1, T2, T3, ..., Tm, formed on the magnetic tape 3 by the magnetic heads H1 and H2. Tracks T1, T3, T5, ..., Tm−5 are the ones which are recorded by the magnetic head H1, while tracks T6, T8, T10, ..., Tm are the ones which are recorded by the magnetic head H2. As is shown in FIG. 9, the four tracks, namely, tracks T2, and T4, and tracks Tm−1, and Tm−3 are left unrecorded because the separation S2 between the centers of the head gaps G1 and G2 of the magnetic heads H1 and H2 have a value equal to five times the track pitch P. But in the case of high track density recording of 1,000 tracks per inch, the recording region having a width V of 25.4 mm and the tracks having a track pitch P of 0.0254 mm, the width of the recording region occupied by the unrecorded tracks is as small as about 0.4 percent of the overall width V of the recording region, and this amount of course is of no practical importance. The head gaps G1 and G2 have gap azimuths $\alpha$ and $\beta$ just as in the case of the first embodiment of the present invention shown in FIGS. 4 through 6, and thus effect an azimuth recording, in the same way.

Referring now to FIGS. 10 through 14, magnetic disk memory devices having four magnetic heads according to the present invention are described.

Figure 10:
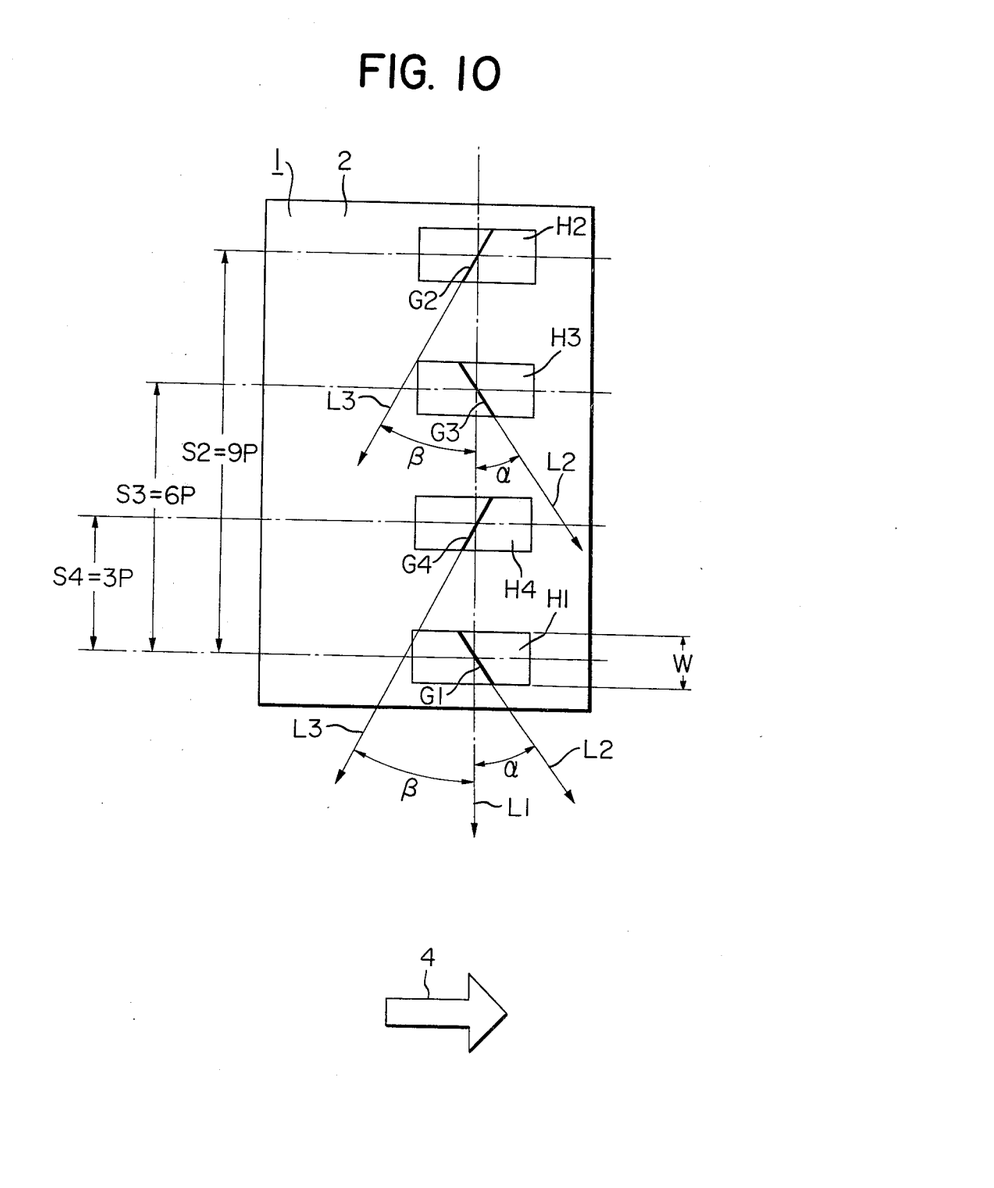
FIG. 10 is a schematic bottom plan view of the flying head assembly of another magnetic disk memory having four magnetic heads according to the present invention, showing the lower face of the flying head assembly thereof.
Figure 11:
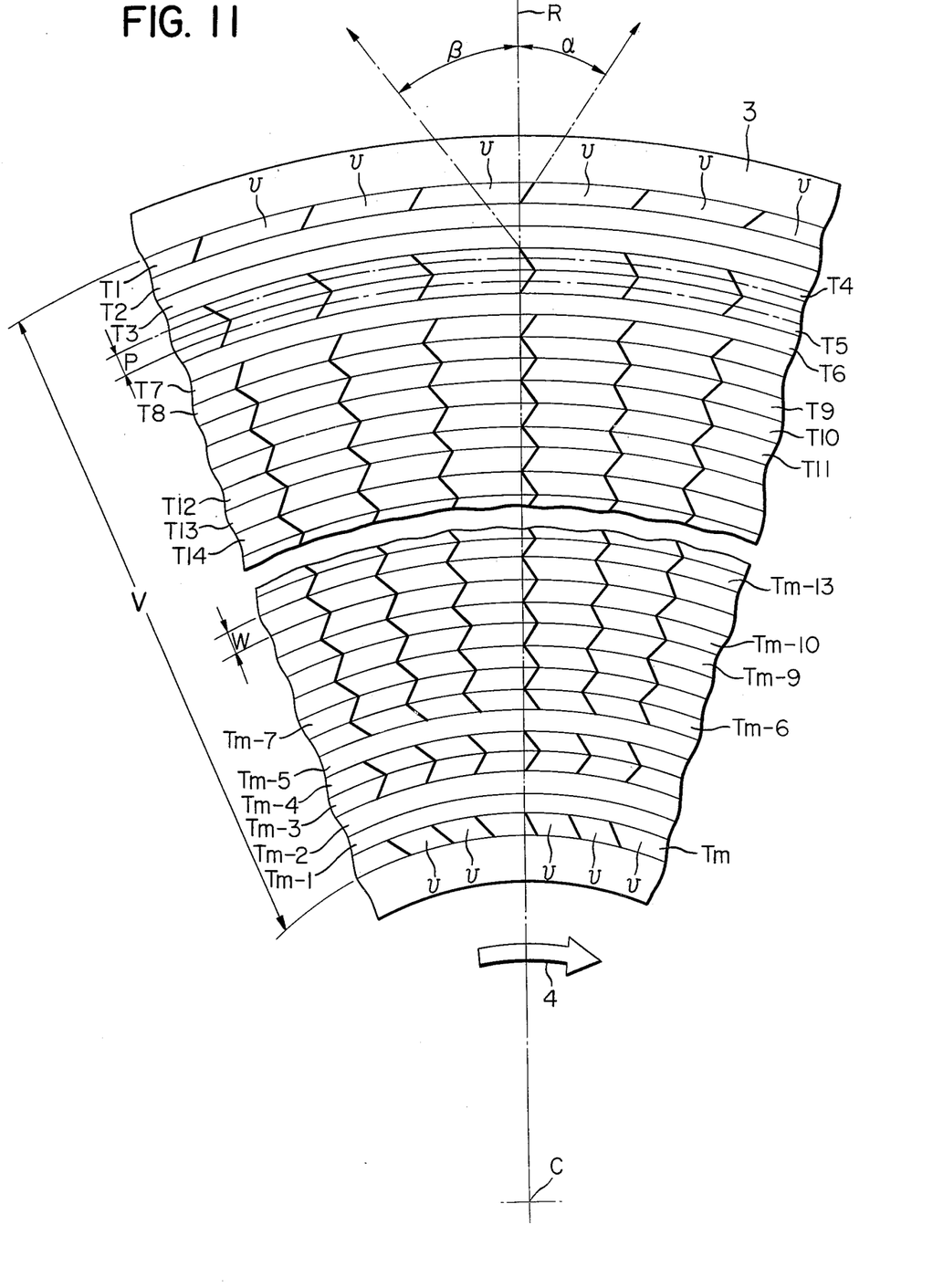
FIG. 11 is a schematic partial plan view of the magnetic disk of the device according to FIG. 11, showing the arrangement of the data tracks formed thereon.

Referring first to FIGS. 10 and 11, an embodiment of the present invention having four magnetic heads is described, FIG. 10 is a schematic bottom plan view of the flying head assembly 1 of a magnetic disk memory having four magnetic heads according to the present invention, and shows the lower or the opposing face of the flying head assembly 1. FIG. 11 is a schematic partial plan view of the magnetic disk 3 thereof, showing the portions of magnetic disk 3 including the outer and inner tracks formed thereon. As is shown in FIG. 10, the flying head assembly 1 of the device comprises a slider 2 having mounted therein four magnetic heads H1, H2, H3, H4, having a width equal to the track width W. The centers of the head gaps of the magnetic heads H1, H2, H3, H4 fall in a straight line L1 which is at right angles to the direction of rotation of the magnetic disk 3. The magnetic head H1 is disposed outermost with respect to the magnetic disk 3, and magnetic heads H2, H3, H4 are disposed in that order in the inwardly pointing radial direction of the magnetic disk 3, the centers of the head gaps G1 through G4 of the magnetic heads H1 through H4 being separated by an equal distance 3P or three times the track pitch P, which is deemed sufficient to prevent the magnetic interference between the magnetic heads in this embodiment. Therefore, separations S1, S2, S3, S4 between the center of head gap G1 of the magnetic head H1 (which is the outermost magnetic head with respect to the disk 3) and the centers of the head gaps G1, G2, G3, G4 of the magnetic heads H1, H2, H3, H4 have the following values:

| | |
|---|---|
| S1 = 0 | (1) |
| S2 = 9P | |
| S3 = 6P | |
| S4 = 3P | |

Thus, the following equations hold:

| | | |
|---|---|---|
| S1/P ≡ 0 | mod. 4 | (2) |
| S2/P ≡ 1 | mod. 4 | |
| S3/P ≡ 2 | mod. 4 | |
| S4/P ≡ 3 | mod. 4 | |

Since the carriage of the device moves the head assembly at right angles to the direction of rotation in steps, with a step of four times the track pitch P, all the tracks can be tracked by the magnetic heads H1, H2, H3, H4 except for a small number of tracks situated near the outer and inner periphery of the magnetic disk 3, as can be easily seen from the equations (2) above. In fact, the tracks formed on the magnetic disk 3 have an arrangement as shown in FIG. 11. At the beginning of recording operation, the magnetic heads H1, H2, H3, H4 are held at the outermost position thereof with respect to the magnetic disk 3, and effect recording on the tracks T1, T10, T7, T4 respectively. Then the flying head assembly 1 is moved by the carriage by a distance of four times the track pitch P, along the radius R to the inner side with respect to the magnetic disk 3, and the tracks T5, T14, T11, T8 are recorded by the magnetic heads H1, H2, H3, H4 respectively. At the next step, the flying head assembly 1 is further moved by said distance, and the tracks T9, T18, T15, T12 are recorded. Thus, by repeating like operations, all the tracks from the outermost track T1 to the innermost track Tm are recorded by the magnetic heads H1, H2, H3, H4, except for six tracks T2, T3, T6, and Tm−5, Tm−2, Tm−1. The number of tracks m of the magnetic disk for this embodiment of the invention having four magnetic heads must satisfy the following equation:

$$(m-6) \equiv 0 \qquad \text{mod.4}$$

That is to say, (m−6) must be a multiple of 4.

If we assume that the track number m be equal to 998, then the number of unrecorded tracks, namely 6, only slightly exceeds 0.6 percent of the number of overall tracks on the magnetic disk 3, namely 998. And moreover, the number of movement steps of the flying head assembly 1 required of this device to complete recording over the entire recording region is much reduced without giving rise to any problems mentioned above.

The head gaps G1 and G3 of the odd numbered magnetic heads H1 and H3 show a gap azimuth $\alpha$ in the direction of rotation of the magnetic disk 3, while the head gaps G2 and G4 of the even numbered magnetic heads H2 and H4 shows gap azimuth $\beta$ against said direction. Therefore, magnetization formed on the odd ordinal tracks by the odd numbered magnetic heads H1 and H3 has inclination $\alpha$ in the direction of rotation of the magnetic disk 3, while that formed on even ordinal tracks by even numbered magnetic heads H2 and H4 has inclination β against the direction of rotation of the magnetic disk 3.

Figure 12:
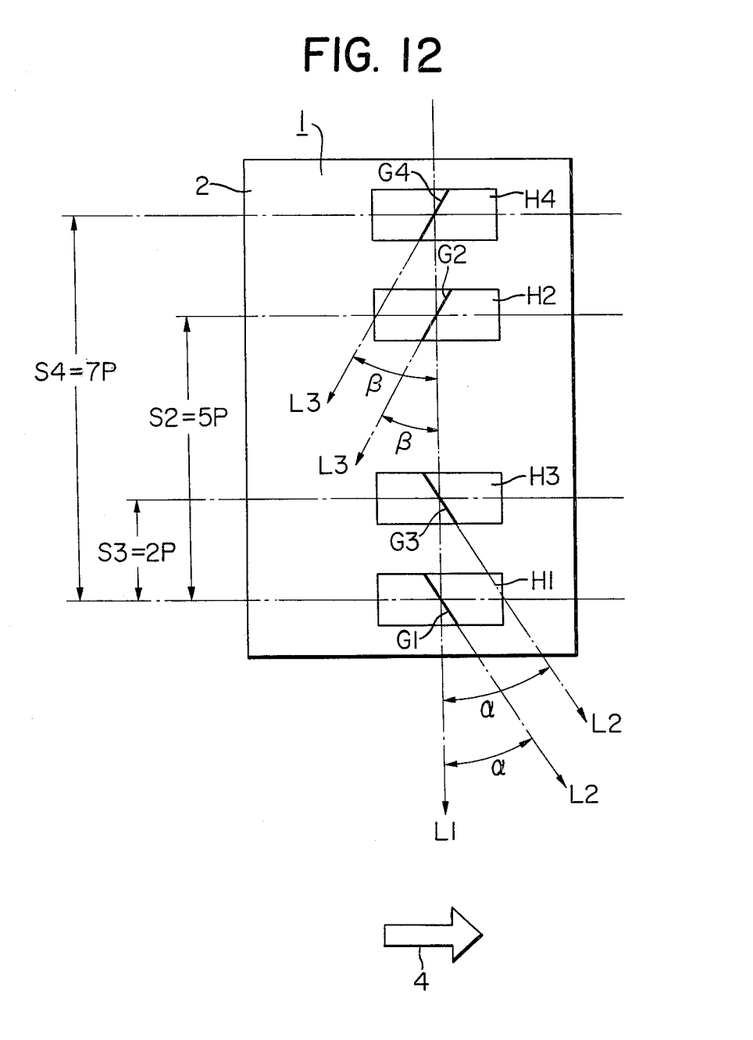
FIG. 12 is a schematic bottom plan view of the flying head assembly of still another magnetic disk memory having four magnetic heads according to the present invention, showing the lower face of the flying head assembly thereof.
Figure 13:
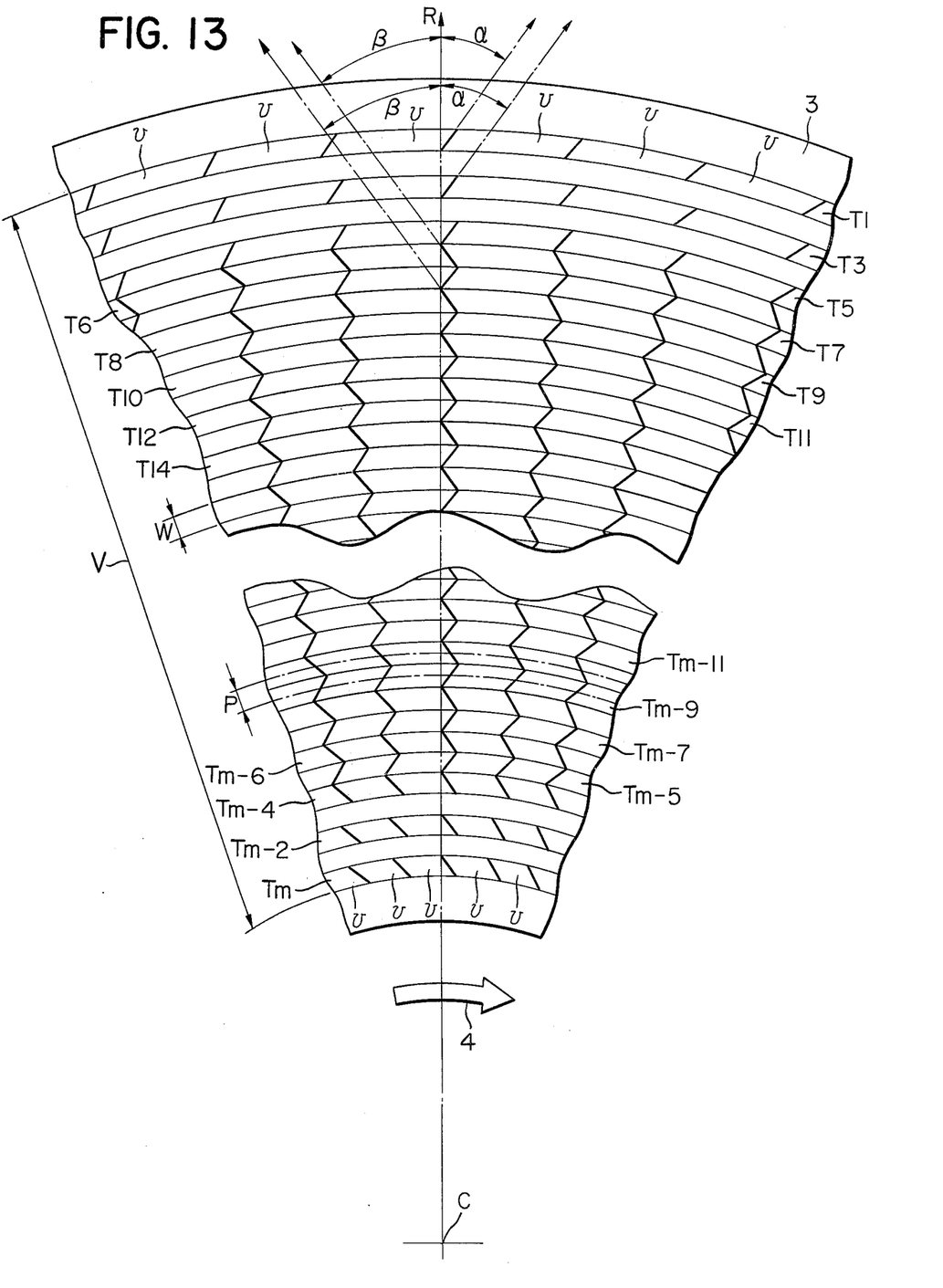
FIG. 13 is a schematic partial plan view of the magnetic disk of the device according to FIG. 13, showing the arrangement of data tracks formed thereon.

Referring now to FIGS. 12 and 13, the head arrangement of another magnetic disk memory device having four magnetic heads is described.

The construction and operation thereof are much the same as those of the last described embodiment according to the present invention, except that the device of FIGS. 12 and 13 has a different configuration of the magnetic heads in the head assembly of the head arrangement.

The flying head assembly 1 comprises a slider 2 having mounted therein four magnetic heads H1, H2, H3, H4. The centers of the head gaps G1, G2, G3, G4 of the magnetic heads H1, H2, H3, H4 fall in a straight line L1 which is in registry with a radius R of the magnetic disk 3. Separations S1, S2, S3, S4 between the center of the head gap G1 of the magnetic head H1 (which is the outermost magnetic head) and the centers of the head gaps G1, G2, G3, G4 of the magnetic heads H1, H2, H3, H4 have the following values:

```
S1 = 0      (P is the track pitch)
S2 = 5P
S3 = 2P
S4 = 7P
```

Therefore, the magnetic head H1 records successively tracks T1, T5, T9, - -Tm−11, Tm−7, the magnetic head H2 records T6, T10, T14, - -Tm−6, Tm−2, the magnetic head H3 records T3, T7, T11, - -Tm−9, Tm−5, and the magnetic head H4 records T8, T12, T16, - -Tm−4, Tm. Thus, all the tracks T1 to Tm are recorded except for four Tracks T2, T4, Tm−3, Tm−1.

The number of tracks m of this embodiment must satisfy the relationship:

$$(m-4) \equiv 0 \quad \mod.4$$

That is to say, (m−4) and therefore, m, must be a multiple of 4.

Assuming that m is equal to 1,000, the number of unrecorded tracks only occupies 0.4 percent of the number of overall tracks, which is negligible for practical purposes.

The head gaps of odd numbered magnetic heads and those of even numbered magnetic heads show different gap azimuths, thereby causing the magnetizations formed on odd ordinal and even ordinal tracks to have different directions.

Figure 14:
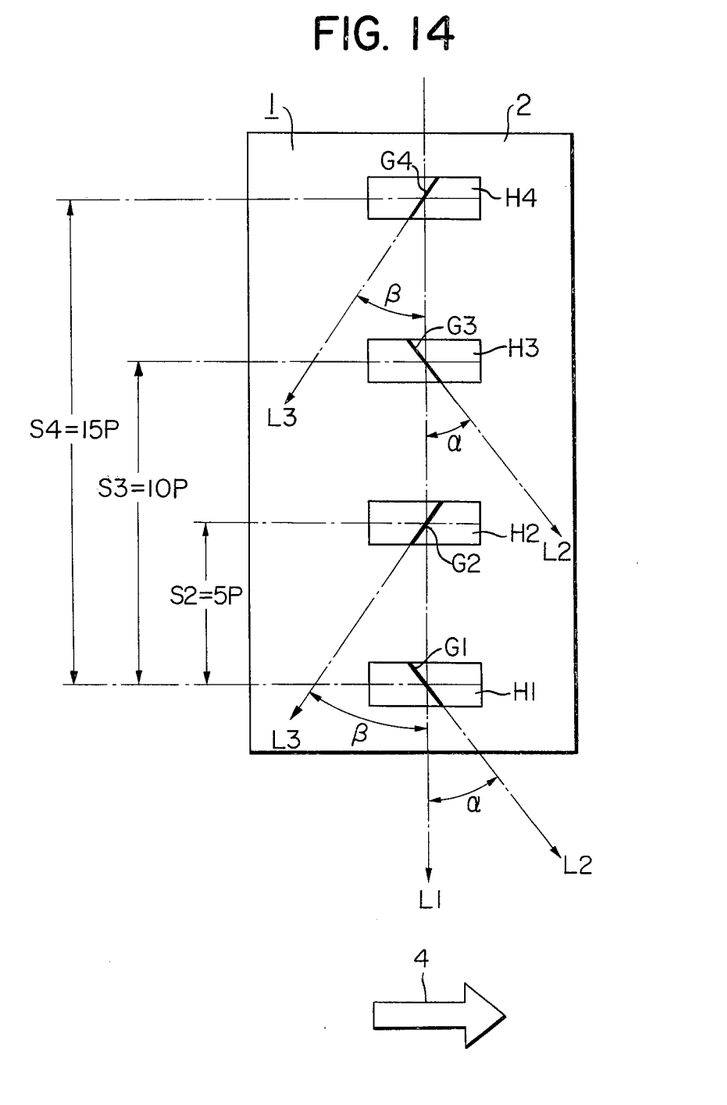
FIG. 14 is a schematic bottom plan view of the flying head assembly of a further magnetic disk memory device having four magnetic heads according to the present invention, showing the arrangement of the magnetic heads in the head assembly thereof.

FIG. 14 is a schematic bottom plan view of the flying head assembly of the head arrangement of a further magnetic disk device having four magnetic heads according to the present invention. The carriage means of the head arrangement of the device moves the head assembly in steps at right angles to the direction of rotation of the magnetic disk with a step of four times the track pitch P. The spacing S2 between the centers of the head gaps G1 and G2 of the magnetic head H1 and the magnetic head H2 in the direction of the movement of the carriage means is equal to 5P, while the spacings S3 and S4 between the magnetic head H1 and the magnetic heads H3 and H4 are equal to 10P and 15P respectively.

Figure 15:
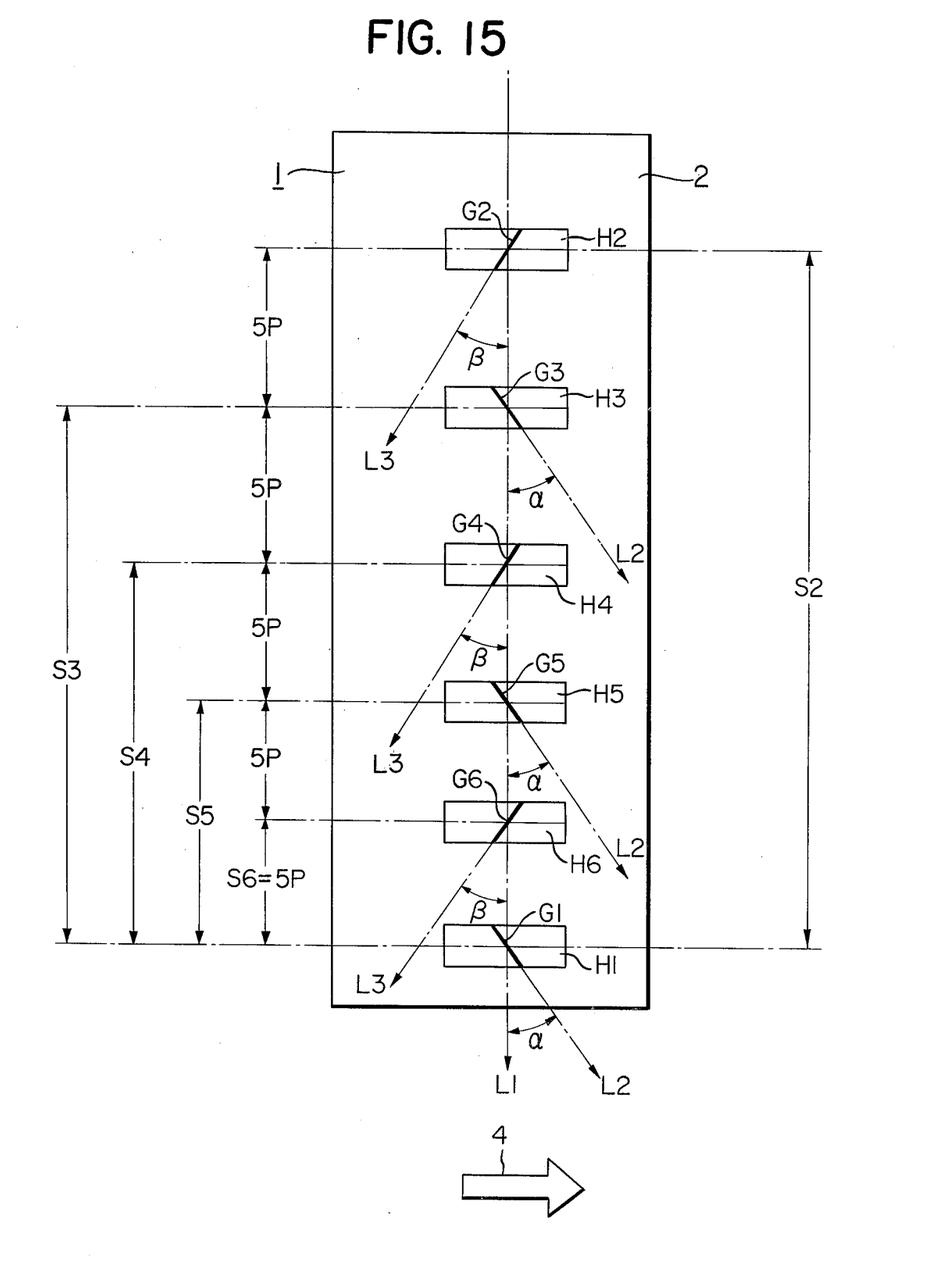
FIG. 15 is a schematic bottom plan view of the flying head assembly of a magnetic disk memory device having six magnetic heads according to the present invention, showing the arrangement of the magnetic heads in the head assembly thereof.

FIG. 15 is a schematic bottom plan view of the flying head assembly of the head arrangement of a magnetic disk device having six magnetic heads according to the present invention. The carriage means of the head arrangement of the device moves the head assembly in steps at right angles to the direction of rotation of the magnetic disk with a step of six times the track pitch P. The spacings S2, S3, S4, S5, S6, between the centers of the head gaps of the magnetic head H1 and the magnetic heads H2, H3, H4, H5, H6 in the direction of the movement of the carriage means are equal to 25P, 20P, 15P, 10P, 5P respectively.

Figure 16:
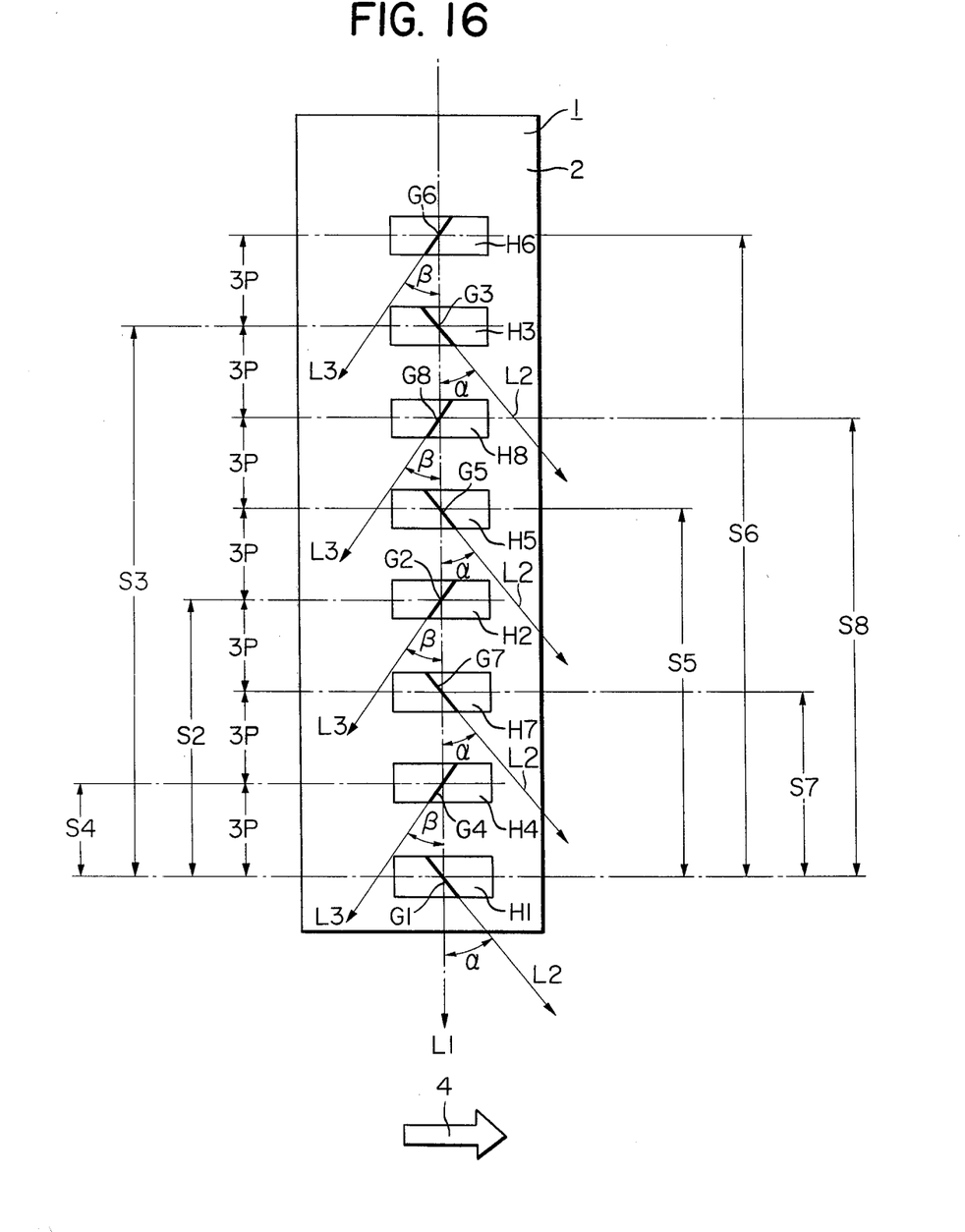
FIG. 16 is a schematic bottom plan view of the flying head assembly of a magnetic disk memory devide having eight magnetic heads according to the present invention, showing the arrangement of the magnetic heads thereof.

FIG. 16 is a schematic bottom plan view of the flying head assembly of the head arrangement of a magnetic disk memory device having eight magnetic heads according to the present invention. The carriage means moves the head assembly in steps at right angles to the direction of rotation of the magnetic disk with a step of eight times the track pitch P. The spacings S2, S3, S4, S5, S6, S7, S8 between the centers of the head gaps of the magnetic head H1 and the magnetic head H2, H3, H4, H5, H6, H7, H8, in the direction of the movement of the carriage means are equal to 9P, 18P, 3P, 12P, 21P, 6P, 15P respectively.

For further details of the devices according to FIGS. 14 to 16, refer to the descriptions made heretofore in conjunction with other devices according to the present invention, or to the description of the principle of the present invention which will follow hereinafter.

Now, the principle of the present invention is described, taking as the example the flying head assembly of the head arrangement of a magnetic disk memory device having 2n magnetic heads.

The flying head assembly of the head arrangement of a magnetic disk memory device having 2n magnetic heads according to the present invention comprises a slider which has mounted therein 2n magnetic heads. The carriage means or shifting mechanism of the head arrangement holds the head assembly at rest when tracking is effected by the magnetic heads, and moves the head assembly in steps at right angles to the direction of rotation of the magnetic disk with a step of 2n times the track pitch P.

The magnetic heads of said device are disposed in said slider in such a configuration that the following two conditions are met:

Condition (1): The separation between any two magnetic heads of the 2n magnetic heads is not less than a distance necessary to prevent the magnetic interference between the two magnetic heads.

Condition (2): The separation or spacing Sj in the direction of movement of said carriage means between the centers of the head gaps of the outermost or first magnetic head H1 and the j th magnetic head Hj satisfies the equation:

$$Sj/P \equiv (j-1) \quad \mod. 2n$$

(Sj/P is congruent to (j−1) with respect to modulus 2n)

As the carriage means moves the head assembly with a step of 2n times the track pitch P, the magnetic head H1 (or the outermost magnetic head) tracks:

$$T(S1/P+1), T(S1/P+1+2n), T(S1/P+1+4n), \ldots$$
$$\text{or } T(1), T(1+2n), T(1+4n), \ldots$$

the magnetic head H2 tracks:

$$T(S2/P+1), T(S2/P+1+2n), T(S2/P+1+4n), \ldots,$$

the magnetic head H3 tracks:

$T(S3/P+1), T(S3/P+1+2n), T(S3/P+1+4n), \ldots,$

.................., and the magnetic head H2n tracks:

$T(S2n/P+1), T(S2n/P+1+2n), T(S2n/P+1+2n), \ldots$ (Note that S1 is equal to zero, and T(k) designates the k th track counting from the outermost track.) Because of the condition (2) above, the following equations hold:

$S1/P+1 \equiv 1$      mod. 2n $S2/P+1 \equiv 2$      mod. 2n $S3/P+1 \equiv 3$      mod. 2n

.............

$S2n/P+1 \equiv 2n$      mod. 2n

Therefore, the magnetic head H1 tracks every track T(k) that satisfies the following two conditions (A) and (B):

(A) $k \equiv 1$      mod. 2n (B) $m-(S-S1)/P \geq k > S2/P,$ the magnetic head H2 tracks every track T(k) that satisfies the following condition (A) and (B):

(A) $k \equiv 2$      mod. 2n (B) $m-(S-S2)/P \geq k > S2/P,$ the magnetic head H3 tracks every track T(k) that satisfies the following conditions (A) and (B):

(A) $k \equiv 3$      mod. 2n (B) $m-(S-S3)/P \geq k > S3/P,$

.............., and the magnetic head H2n tracks every track T(k) that satisfies the following conditions (A) and (B):

(A) $k = 2n$      mod. 2n (B) $m-(S-S2n)/P \geq k > S2n/P.$

In the equations above, m is the number of tracks, and S is the maximum value of the Sj's or the distance in the direction of the movement of said carriage means between the centers of the two magnetic heads which are lying outermost in said direction.

The configuration of the magnetic heads in the slider of the head assembly satisfies further:

Condition (3), that the centers of the head gaps of at least two magnetic heads out of 2n magnetic heads fall in a straight line which is parallel to the direction of the movement of the carriage means, or preferably, condition (3'), that all the centers of the head gaps of the 2n magnetic heads fall in a straight line which is parallel to the direction of the movement of the carriage means.

Because of these condition (3) or (3'), the device according to the present invention is less affected by the drawbacks of the prior art devices as mentioned above.

And finally, the configuration of the magnetic heads in the slider of the head assembly satisfies the following condition:

Condition (4): The head gaps of odd numbered and even numbered magnetic heads of the 2n magnetic heads have different gap azimuths.

Because of this condition (4), the magnetization formed by said head gaps on odd ordinal and even ordinal tracks are caused to have different directions from each other.

In the embodiments described heretofore, the width of the magnetic heads, or the track width W was assumed to be substantially equal to the track pitch P. But it goes without saying that the present invention is applicable to the cases wherein W is greater or less than P, with the same effects being obtained as with the cases heretofore described. When W is greater than P, the tracks recorded by the azimuth recording method overlap with each other. When W is less than P, there are left inter-track regions. In any case, as the recording is effected by the azimuth recording method, there is no interference or cross-talk between the tracks.

Because of the configuration of the magnetic heads in the head assembly and the movement of the carriage means of the devices according to the present invention heretofore described, while the devices according to the present invention realize high density track arrangement without leaving any unrecorded tracks except for a small portion of the recording region on the magnetic medium near the peripheries of the recording region, differences in the recording and reproducing characteristics of the magnetic heads, magnetic interference between the magnetic heads, and interference or crosstalk between the tracks are decreased. Therefore, the present invention provides a magnetic recording and reproducing device in which the manufacture of the head assembly and the carriage means or shift mechanism of the head arrangement is made easier.

What is claimed is:

1. A magnetic recording and reproducing head arrangement for use with a moving magnetic recording medium, comprising:

an even number 2n of magnetic heads (n being an integer not less than 1) each including a magnetic gap and spaced apart from each other at least by a distance effective for preventing magnetic interferences between said magnetic heads, said magnetic heads being so disposed with respect to the recording medium that said magnetic heads, in use, are effective for forming and tracking recorded tracks on the recording medium, said tracks having a track pitch P therebetween; and means for both supporting said magnetic heads in a fixed positional relationship therebetween and for shifting in steps said magnetic heads, when the tracks to be recorded or reproduced are to be changed, in a direction perpendicular to the direction of movement of portions of the recording medium adjacent to said magnetic heads, each of said steps being equal to 2n times said pitch P of the tracks to be formed on the recording medium;

wherein centers of said gaps of at least two magnetic heads of said 2n magnetic heads lie in a straight line parallel to said direction of shift of said magnetic heads;

wherein said magnetic gap center of the j th magnetic head is spaced apart in the direction of shift of said magnetic heads by a distance Sj from that of an outermost magnetic head, said distance Sj satisfying the equation:

$$Sj/P = (j-1) \quad \text{modulo } 2n,$$

where
j is an integer not less than 1 but not greater than 2n; and
wherein the j th magnetic heads, j being an odd integer, of said 2n magnetic heads have magnetic gaps extending in an azimuth direction different from the magnetic gaps of the j th magnetic heads, j being an even integer, so as to be effective to prevent magnetic interference between adjacent tracks.

2. A magnetic head arrangement as claimed in claim 1, wherein said gap centers of all of said magnetic heads lies in said shift direction of said magnetic heads.

3. A magnetic head arrangement as claimed in claim 1 or 2, wherein said magnetic heads are floating magnetic heads which float when the recording medium is moving.

4. A magnetic head arrangement as claimed in claim 1 or 2, wherein said magnetic heads contact the recording medium in use.

5. A magnetic recording and reproducing head arrangement for tracking a plurality of parallel tracks formed on a magnetic recording medium uniformly moving with respect to said head arrangement, which comprises:
an even number 2n of magnetic heads each having a magnetic gap, wherein n is an integer not less than 1;
means for holding said magnetic heads in a fixed positional relationship with respect to each other, wherein said magnetic heads are arranged such that:
(a) the center of the magnetic gap of one of said 2n magnetic heads is spaced by a distance $Sj = (j-1+2nk) P$ in a direction perpendicular to the movement of said magnetic recording medium from the center of the magnetic gap of a magnetic head which is positioned outermost in the direction perpendicular to the movement of said recording medium, wherein P is the track pitch of said parallel tracks, j is an integer not less than 1 and not greater than 2n, and k is an integer not less than 0;
(b) the centers of the magnetic gaps of at least two magnetic heads of said 2n magnetic heads lie in a straight line perpendicular to the direction of the movement of said recording medium;
(c) the centers of the magnetic gaps of said 2n magnetic heads are spaced from each other at least by a distance not less than two times said track pitch P in the direction perpendicular to the movement of said magnetic recording medium; and
(d) the magnetic gaps of the magnetic heads whose centers are spaced from the center of the magnetic gap of the outermost magnetic head by distances Sj, wherein j is an odd number, extend in a first azimuth direction which is tilted with respect to the direction perpendicular to the movement of said recording medium, and the magnetic gaps of the magnetic heads whose centers are spaced from the center of the magnetic gap of the outermost magnetic head by distances Sj, wherein j is an even number, extend in a second azimuth direction which is tilted in an opposite direction from said first azimuth direction with respect to the direction perpendicular to the movement of said recording medium; and
means for shifting said holding means in the direction perpendicular to the movement of said recording medium in steps equal to 2n times the track pitch P of said parallel tracks formed on the magnetic recording medium.

6. A magnetic head arrangement as claimed in claim 5, wherein the centers of the magnetic gaps of said 2n magnetic heads lie in a straight line perpendicular to the direction of the movement of the recording medium.

* * * * *